United States Patent
Færevaag (10) Patent No.: US 9,032,129 B2
(45) Date of Patent: May 12, 2015

(54) ADVANCED ENERGY PROFILER

(75) Inventor: Erik Fossum Færevaag, Bergen (NO)

(73) Assignee: Silicon Laboratories Norway AS, Oslo (NO)

( * ) Notice: Subject to any disclaimer, the term of this patent is extended or adjusted under 35 U.S.C. 154(b) by 411 days.

(21) Appl. No.: 12/904,630

(22) Filed: Oct. 14, 2010

(65) Prior Publication Data

US 2011/0087908 A1      Apr. 14, 2011

Related U.S. Application Data

(60) Provisional application No. 61/251,599, filed on Oct. 14, 2009.

(51) Int. Cl.
*G06F 17/18*      (2006.01)
*G06F 1/32*      (2006.01)

(52) U.S. Cl.
CPC ..................... *G06F 1/3203* (2013.01)

(58) Field of Classification Search
CPC ................................... G06F 17/18; G06F 1/32
USPC ................................................. 713/322, 340
See application file for complete search history.

(56) References Cited

U.S. PATENT DOCUMENTS

| | | | |
|---|---|---|---|
| 5,557,557 A | 9/1996 | Frantz et al. | |
| 6,002,878 A | 12/1999 | Gehman et al. | |
| 6,125,334 A * | 9/2000 | Hurd | 702/60 |
| 6,553,502 B1 | 4/2003 | Hurd et al. | |
| 6,820,222 B2 | 11/2004 | Swoboda | |
| 7,089,135 B2 * | 8/2006 | Rajsuman et al. | 702/117 |
| 7,174,468 B2 * | 2/2007 | Gary et al. | 713/300 |
| 7,178,115 B2 * | 2/2007 | Rajsuman et al. | 716/136 |
| 7,337,433 B2 | 2/2008 | Cyran et al. | |
| 7,363,517 B2 | 4/2008 | Bodas | |
| 7,539,885 B2 * | 5/2009 | Ma | 713/322 |
| 7,555,666 B2 * | 6/2009 | Brundridge et al. | 713/340 |
| 7,634,668 B2 * | 12/2009 | White et al. | 713/300 |
| 7,739,572 B2 * | 6/2010 | Kang | 714/738 |
| 7,793,120 B2 * | 9/2010 | McGrane et al. | 713/300 |
| 7,861,235 B2 * | 12/2010 | Watanabe | 717/140 |
| 7,971,035 B2 * | 6/2011 | Singh et al. | 712/220 |
| 8,041,976 B2 * | 10/2011 | Kern et al. | 713/324 |
| 8,166,326 B2 * | 4/2012 | Pagan | 713/324 |
| 2006/0242504 A1 * | 10/2006 | Kadota | 714/725 |
| 2007/0124618 A1 * | 5/2007 | Aguilar et al. | 713/322 |
| 2008/0284460 A1 * | 11/2008 | Agarwal et al. | 324/769 |

(Continued)

*Primary Examiner* — Paul R Myers
*Assistant Examiner* — Christopher A Daley
(74) *Attorney, Agent, or Firm* — Miller, Matthias & Hull LLP (57) ABSTRACT

An energy profiling apparatus for profiling power consumption characteristics of code being executed at an integrated circuit being powered by a power source and having a measurement module, a data processing module and a display module is disclosed. The energy profiling apparatus comprises first, second and third interfaces as well as a profile module. The first interface is configured to receive a first data set from the measurement module. The second interface is configured to receive a second data set from the data processing module. The third interface is configured to transmit a third data set to the display module. The profile module is configured to generate an energy profile of the code executed at the data processing module based on a correlation between the first data set and the second data set. Furthermore, the profile module is configured to transmit the energy profile as part of the third data set to the display module.

19 Claims, 7 Drawing Sheets

(56) References Cited

U.S. PATENT DOCUMENTS

| | | | |
|---|---|---|---|
| 2008/0307282 A1* | 12/2008 | Dono et al. | 714/736 |
| 2009/0222225 A1* | 9/2009 | Kojima et al. | 702/64 |
| 2009/0309556 A1* | 12/2009 | Franco et al. | 323/234 |
| 2010/0138206 A1* | 6/2010 | Nottebaum et al. | 703/12 |
| 2010/0164527 A1* | 7/2010 | Weyh et al. | 324/763 |
| 2010/0175866 A1* | 7/2010 | Tani et al. | 165/287 |
| 2011/0000829 A1* | 1/2011 | Linde et al. | 209/571 |

* cited by examiner

ADVANCED ENERGY PROFILER

CROSS-REFERENCE TO RELATED APPLICATION

This application claims priority to U.S. Provisional Application Ser. No. 61/251,599, filed on Oct. 14, 2009.

BACKGROUND

1. Technical Field

The present disclosure relates to energy profilers, and more particularly, to devices and methods for profiling power consumption of executed processor code in real-time so as to facilitate adjustments of power management strategies for any given application.

2. Description of the Related Art

As consumers become increasingly more environment-conscious, there are increased efforts in the field of electronics and computing to reduce power consumption, minimize production costs, decrease product size and optimize overall efficiency. Additionally, as the number of portable devices and electronics flourishes, the need for longer lasting battery-driven applications also rises. Accordingly, there are also increased efforts to optimize the energy density of battery cells and/or to minimize the power consumed by a particular battery-driven device. However, as developments in the field of batteries saturate, the focus turns to more energy efficient and longer lasting battery-driven applications. While hardware improvements may improve upon the overall efficiency of a device, improving the manner in which software or an application is executed, providing better detection of architecture flaws, and enabling a developer to find the optimum software architecture may provide further means for maximizing battery life.

Integrated circuits may be based upon and centered on a processor, controller, or a central processing unit (CPU), which is used to execute and perform an application, or a sequence of codes or functions that are preprogrammed into the processor by developers. Depending on the code or function that is executed, the power consumed by the processor may vary significantly. Furthermore, the applications or processes being performed on the processor may be configured according to different strategies or performance aims, all of which may be defined by a developer. For instance, the processor may be configured to operate with speed and performance as its first priority. Alternatively, a processor may be configured to operate on minimal power as its first priority.

In order to minimize the overall power consumed by a processor while executing such code, a developer must first be able to trace the code that is being executed, and determine the amount of power that is consumed by the code being executed. Only then can the developer begin managing and optimizing power consumption characteristics of the application to be executed. Automated code analysis tools exist to aid developers in analyzing the power consumption characteristics of an application. Specifically, such tools may provide information about a processor, the code being executed on the processor and power usage information thereof. Other such tools may actually assist the developer in generating optimized code.

Although limited means for power profiling currently exist, they have their drawbacks. For instance, many of the currently existing tools which help profile power consumption characteristics of applications require developers to purchase additional equipment and/or analysis tools, which can be costly and time consuming. Furthermore, currently existing energy profile tools are quite complex and cannot be easily integrated into the particular device under development or review. Existing systems further fail to present live or real-time power consumption information, which introduces additional complications to developers.

Therefore, there is a need for an improved energy profiling device and method that can improve upon all of the drawbacks set forth above, and still, provide facilitated techniques for profiling power of any given application. Specifically, there is a need for an energy profiler that can be included within an evaluation board to reduce costs, operate independently of a central processor, provide a more simplified interface with a processor, and provide real-time power consumption information.

SUMMARY OF THE DISCLOSURE

In satisfaction of the aforenoted needs, an advanced energy profiling apparatus and method for profiling energy consumption characteristics of code being executed at a data processing module are disclosed.

An energy profiling apparatus for profiling power consumption characteristics of code being executed at an integrated circuit being powered by a power source and having a measurement module, a data processing module and a display module is disclosed. The energy profiling apparatus comprises first, second and third interfaces as well as a profile module. The first interface is configured to receive a first data set from the measurement module. The second interface is configured to receive a second data set from the data processing module. The third interface is configured to transmit a third data set to the display module. The profile module is configured to generate an energy profile of the code executed at the data processing module based on a correlation between the first data set and the second data set. Furthermore, the profile module could be configured to transmit the energy profile as part of the third data set to the display module.

In a refinement, the profile module is configurable to be operated independently of the data processing module.

In another refinement, the first interface is configured to allow communications with the measurement module in real-time.

In another refinement, the first data set pertains at least in part to instantaneous current consumption.

In another refinement, the second interface is configured to be a one-pin interface.

In another refinement, the second interface is configured communicate at an interface frequency that is independent of a clock frequency of the data processing module.

In another refinement, the second data set includes application trace data.

In another refinement, the correlation includes a statistical interpretation of measurements of the first data set and sub-sampled trace data of the second data set.

In yet another refinement, the third data set includes graphical information for appropriately displaying the energy profile at the display module.

A method for profiling energy consumption characteristics of code being executed at a data processing module is also disclosed. The method comprises the steps of receiving a first data set pertaining to power consumption information of the data processing module, receiving a second data set pertaining to application trace information of the code being executed at the data processing module, generating a correlation between the first data set and the second data set, generating an energy profile based on the correlation, and outputting the energy profile to a display module.

In a refinement, the step of receiving the first data set occurs in real-time.

In another refinement, the second data set pertains at least in part to instantaneous current consumption.

In another refinement, the step of receiving the second data set occurs at an interface frequency that is independent of clock frequency of the data processing module.

In another refinement, the step of receiving the second data set is received through a one-pin interface.

In another refinement, the step of receiving the second data set is received at an interface frequency that is independent of a clock frequency of the data processing module.

In another refinement, the step of generating the energy profile is operable independently of the data processing module.

In another refinement, the correlation includes a statistical interpretation of measurements of the first data set and sub-sampled trace data of the second data set.

In yet another refinement, the energy profile includes graphical information for appropriately displaying the energy profile at the display module.

Other advantages and features will be apparent from the following detailed description when read in conjunction with the attached drawings.

BRIEF DESCRIPTION OF THE DRAWINGS

The disclosed energy profiling apparatus and method are described more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. It should be understood, of course, that this disclosure is not limited to the particular embodiments and methods illustrated herein.

DETAILED DESCRIPTION OF THE DISCLOSURE

Figure 1:
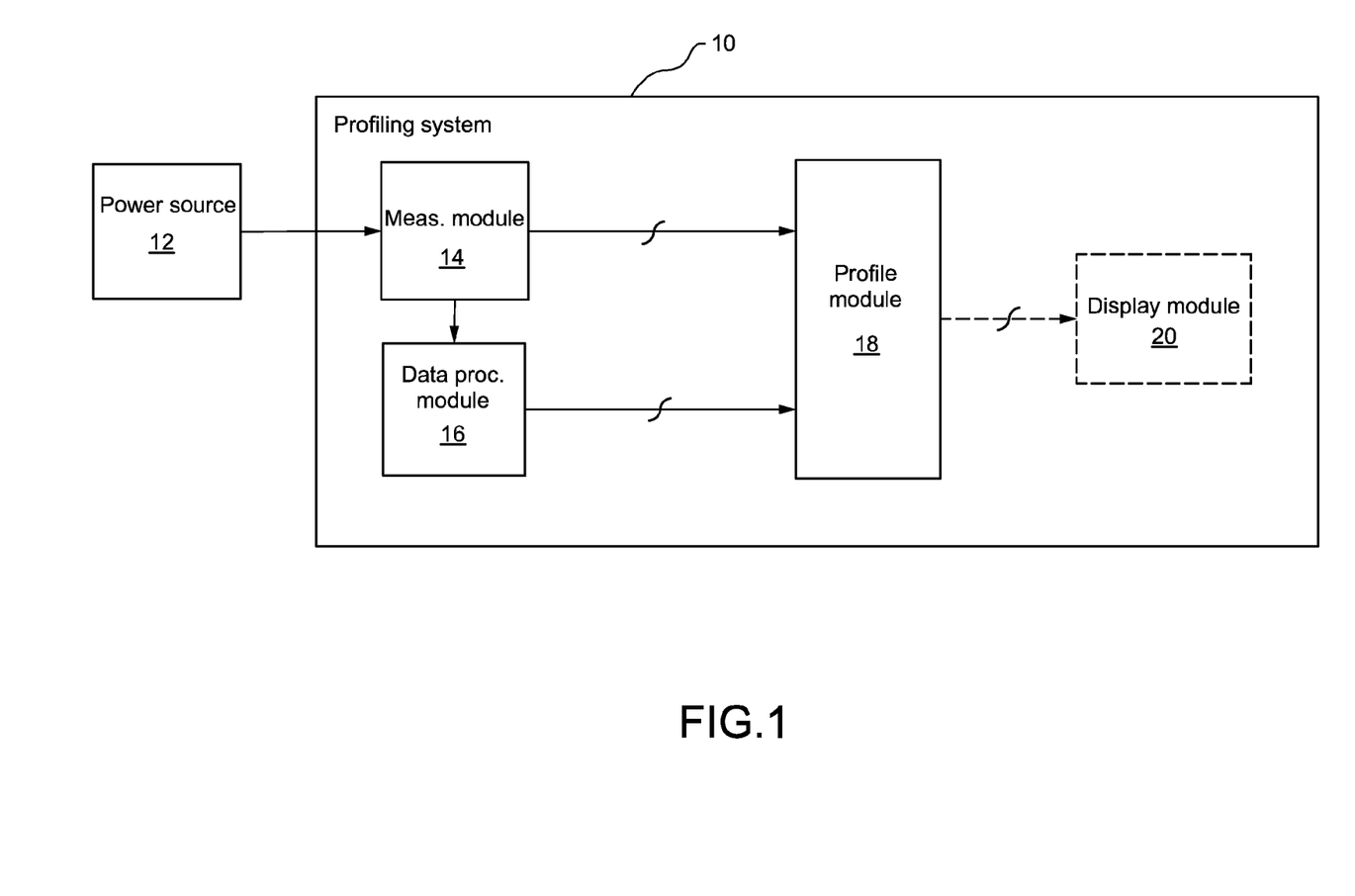
FIG. 1 is a schematic of an exemplary energy profiling system that is constructed in accordance with this disclosure.

FIG. 1 illustrates an exemplary energy profiling system 10 of a typical integrated circuit being powered by a power source 12 that is constructed in accordance with this disclosure. As shown, the energy profiling system 10 may essentially include a measurement module 14, a data processing module 16 and a profile module 18. The energy profiling system 10 may further include an interface or means for communicating with a display module 20 through which the profiling system 10 may output an energy profile for viewing by a user. Furthermore, the energy profiler 10 may output data associated with a particular energy profile to an external device for post processing, for example, to a personal computer, or the like.

The measurement module 14 of FIG. 1 may be configured to at least partially receive a supply voltage and/or current signal from a power source 12, and further, configured to output a first data set of measurements. More specifically, the measurement module 14 may be disposed, for instance, in series, between the data processing module 16 and the power source 12 so as to detect the voltage applied, or current drawn, by the data processing module 16 while executing code. The measurement module 14 may further be configured to measure the power consumption characteristics of the data processing module 16 in real-time. The first data set output by the measurement module 14 may include instantaneous current consumption and supply voltage characteristics of the data processing module 16, or the like.

Figure 2:
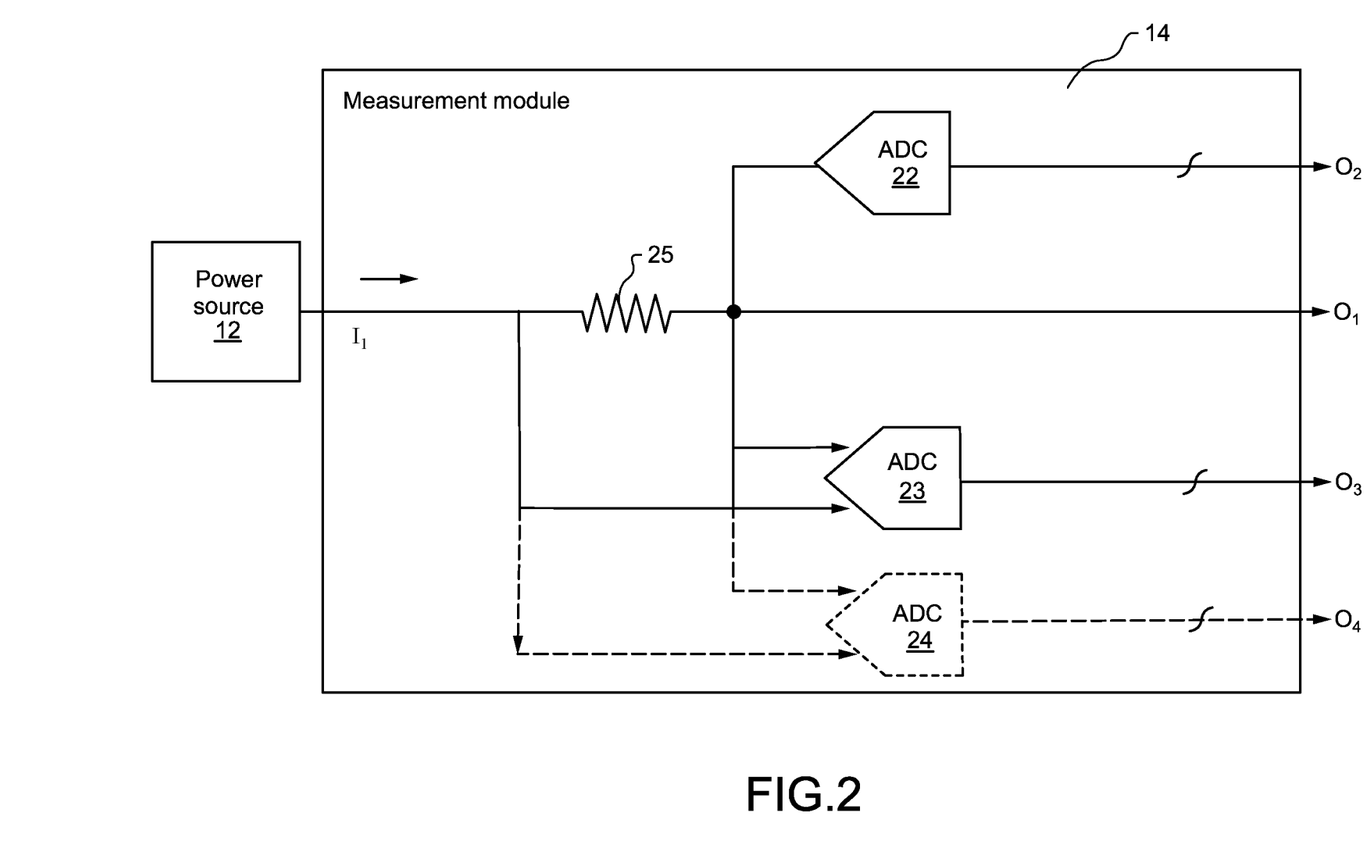
FIG. 2 is a schematic of a measurement module of the energy profiling system of FIG. 1.

The measurement module 14 may employ means for measuring power and/or current consumption rates that are well known in the art of integrated circuits. As shown in FIG. 2, for instance, the measurement module 14 may receive supply current from the power source 12 at an input I1, output the supply current to the data processing module 16 at an output O1. The measurement module 14 may also be programmable to, for instance, to determine various parameters O2-O4 of the current using one or a series of analog-to-digital converters (ADCs) 22-24 and one or more resistors 25, which may be programmable. The ADCs 22-24 may be configured to individually measure voltage and current parameters, or any other combination of parameters required to determine power consumption of the data processing module 16. For example, the first ADC 22 may be configured to provide a voltage reading output O2 corresponding to the potential difference across O2 and ground, while the second and third ADCs 23, 24 may be configured to provide voltage readings across a resistor 25, which may be adjustable and/or programmable, corresponding to the current flowing out from O2. In particular, the second ADC 23 may be a low speed, high accuracy ADC configured to provide more accurate current readings, while the third ADC 24 may be a high speed, low accuracy ADC configured to provide more high speed current readings. Such configurations may be provided by sampling of the differential voltage over the resistor 25. This may allow detection of current with magnitudes of, for instance, 10 nA to 100 mA, and bandwidths of, for instance, approximately 0 to 100 MHz or more.

Figure 3:
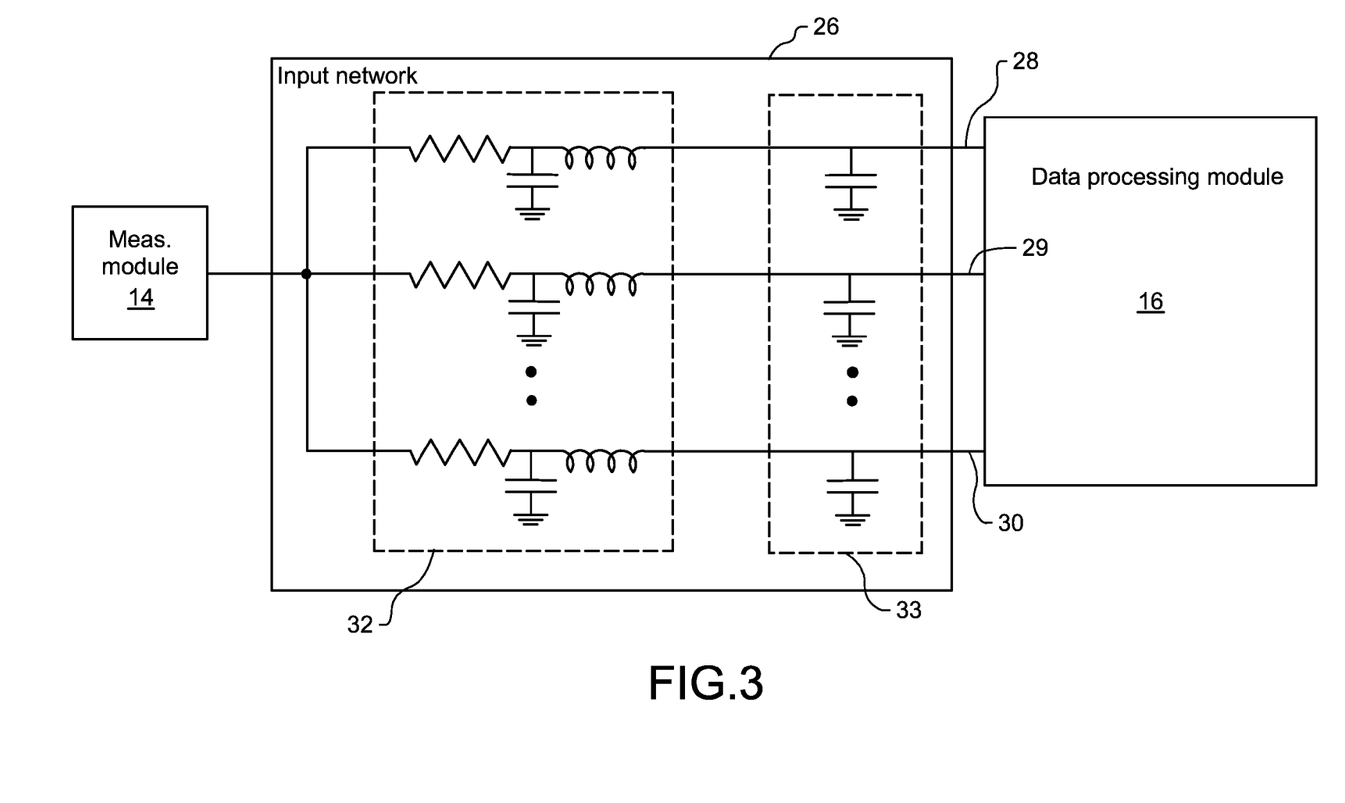
FIG. 3 is a schematic of an input network model of a data processing module of the energy profiling system of FIG. 1.

As shown in FIG. 3, the measurement module 14 may generally be coupled to the data processing module 16 through an input network 26 to provide one or more supply voltages 28-30 to the data processing module 16. More specifically, for each supply 28-30 provided to the data processing module 16, the input network 26 may provide a set of parasitic and/or circuit components 32 and decoupling capacitances 33. When combined with real-time data, knowledge about the input network characteristics may provide, for instance, instantaneous current consumption information of the data processing module 16 in its entirety. The determined instantaneous current consumption may then be combined with trace information provided by a trace module, or the like, at a later stage to provide a real-time energy profile for the code being executed on the data processing module 16.

Figure 4:
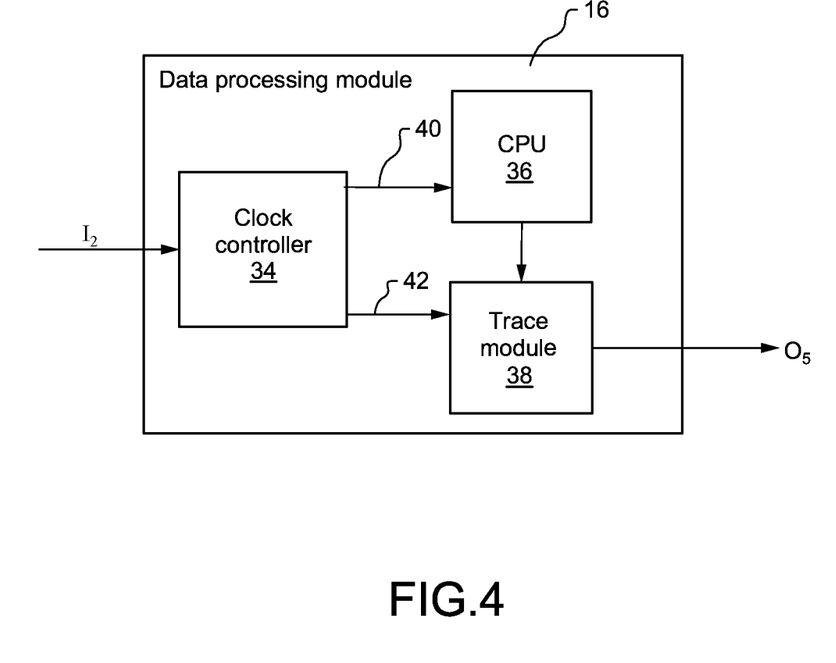
FIG. 4 is a schematic of the data processing module of FIG. 1.

The data processing module 16 of FIG. 1 may include a control unit such as a processor, microprocessor, controller, microcontroller, or the like, and may serve to execute an application or a set of codes. More specifically, as shown in FIG. 4, the data processing module 16 may include a clock controller 34, such as a clock management unit (CMU), or the like, a central processing unit (CPU) 36, a trace module 38, and the like. The clock controller 34 may receive a clock signal at an input 12 from an oscillator, or the like, and output two independent clock signals 40, 42 as shown. For instance, the clock controller 34 may output a first clock signal 40 having a first frequency to the CPU 36, and a second clock signal 42 having a second frequency to the trace module 38, wherein the second frequency may be substantially greater than the first frequency. In response, the CPU 36 may operate or execute codes at the first frequency while the trace module 38 may process trace data at the substantially faster second frequency to be transmitted to a profile module 18 via an interface or output O5.

Figure 5:
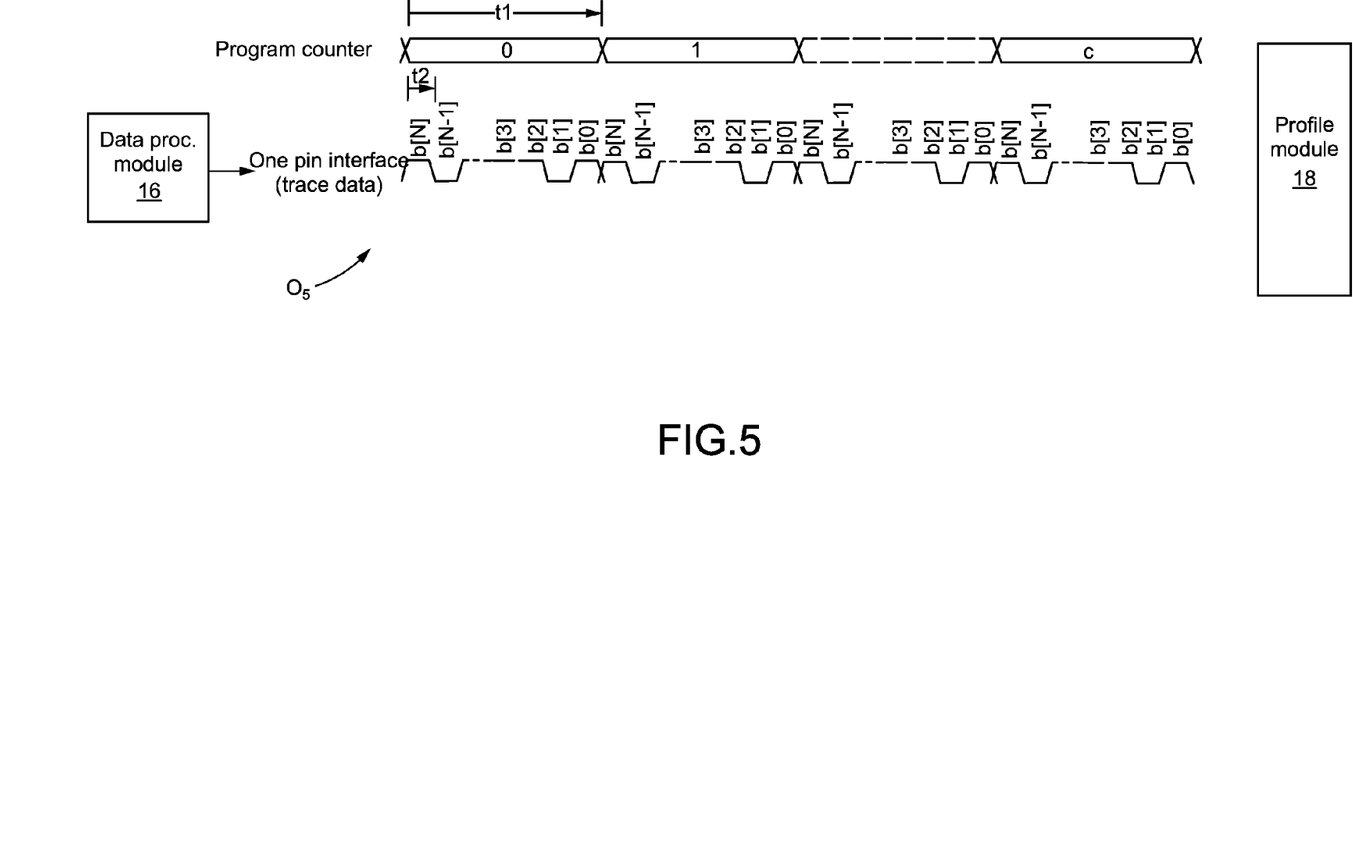
FIG. 5 is an exemplary timing diagram of data being transmitted via a one-pin interface between the data processing module and a profile module of FIG. 1.

The data processing module 16 may be configured to output a second data set to the profile module 18, wherein the second data set includes application trace data provided by the trace module 38, or any other data suitable for tracking code execution as is well known in the art. Furthermore, the data processing module 16 may be configured to output trace data to the profile module 18 via a one-pin interface, as shown for instance by the signal O5 of FIG. 5. As previously disclosed, the trace data provided by the data processing module 16 may be transmitted at a substantially higher frequency or data transfer rate, for example, 16 MHz, than that of the clock frequency of the CPU 36, for example, 1 MHz. Accordingly, several bits of trace information may be serially transmitted to the profile module 18 per one program count or step, as illustrated in FIG. 5. The higher data transfer rate of the one-pin or serial transfer interface may enable significantly more detailed debug information for each program count or step.

Figure 6:
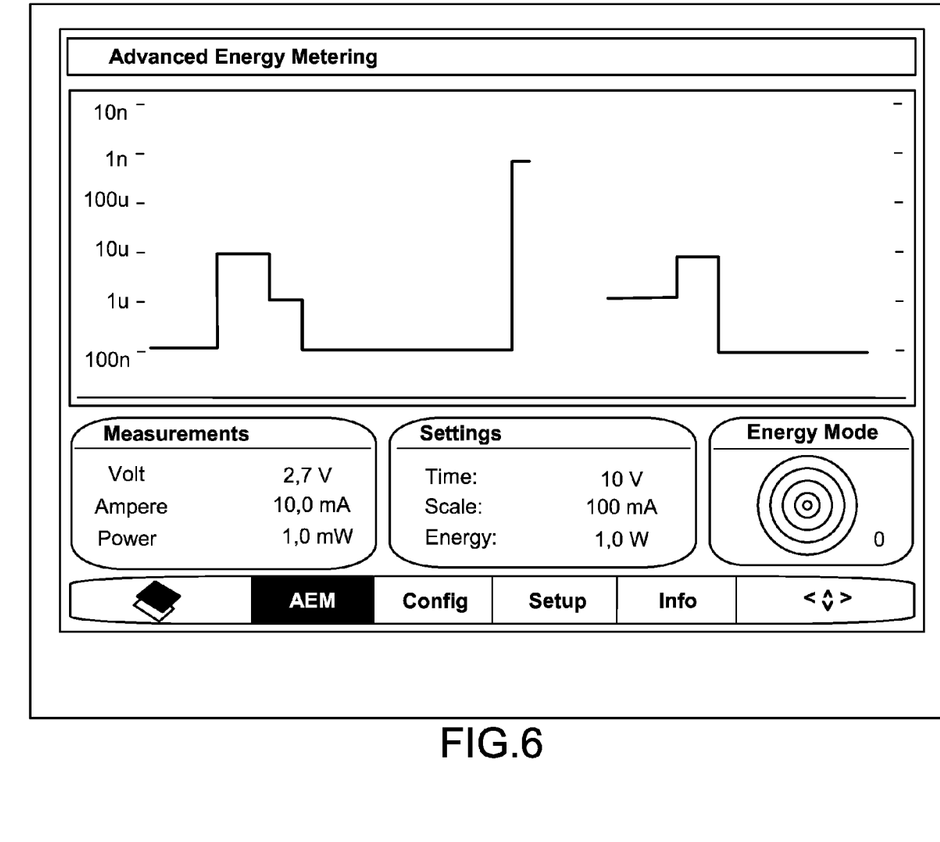
FIG. 6 is an exemplary energy profile that is generated by the profile module of FIG. 1.

Upon receiving measurement data and trace data from the measurement module 14 and the data processing module 16, respectively, the profile module 18 may generate an energy profile of any particular application. Moreover, via a one-pin or serial interface having a data transfer rate that is independent of clock frequency as previously disclosed, the profile module 18 may be enabled to generate substantially detailed power consumption information per code that is executed at the data processing module 16. However, a particular interface between the data processing module 16 and the profile module 18 may not be capable of transferring all of the trace data. Accordingly, the profile module 18 may employ a statistical method, or the like, which sub-samples the trace data and uses the sub-sampled trace data for generating full coverage energy profiles. The resulting energy profiles may further be output, for instance, to the display module 20 of FIG. 1. Additionally, the resulting energy profiles and/or raw data associated with the energy profiles may be output to one or more display units, an external computer resource, such as a personal computer, or the like, and any combination thereof. Moreover, the profile module 18 may output a third data set which includes, at least in part, graphical information for graphically displaying the energy profile for viewing by a user. For example, the energy profile of a particular application may be graphically presented at a display module 20 in the form of a power consumption curve with respect to time, as shown in FIG. 6, or as a specific energy consumption number, or the like, for each instruction and/or code sequence. The third data set may further provide, at least in part, instantaneous current consumption information after evaluation board processing.

Figure 7:
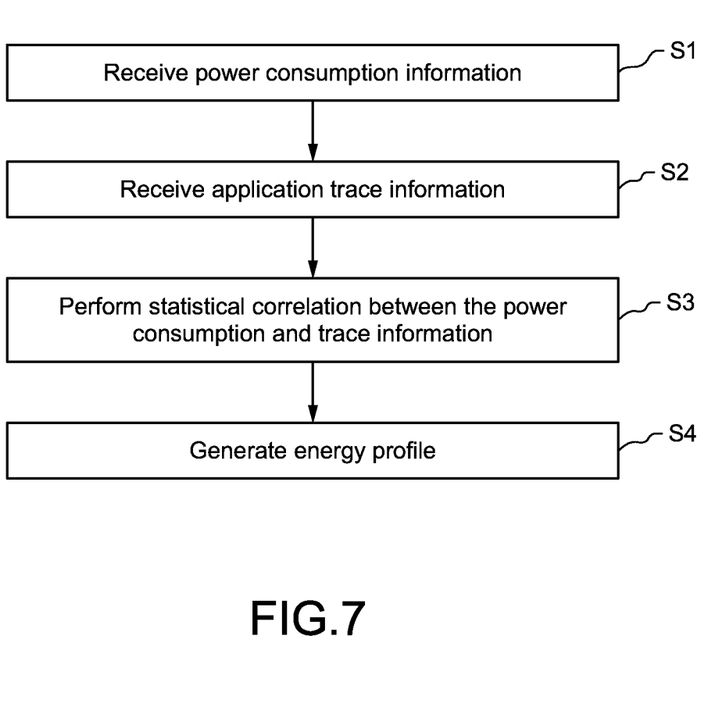
FIG. 7 is an exemplary flow diagram of a method for profiling energy consumption characteristics of code being executed at a data processing module.

Turning now to FIG. 7, an exemplary flow chart for profiling energy consumption characteristics of executed code is disclosed. As shown, the method for generating an energy profile may essentially include steps S1-S4. For instance, in a step S1, a first data set pertaining to power consumption information of a data processing module 16 may be received. In a step S2, a second data set pertaining to application trace information of the code being executed at the data processing module 16 may be received. Based on the power consumption and application trace information, a correlation may be generated in a step S3. From the correlation between the first and second data sets, an energy profile may be generated in a step S4. In additional steps, the energy profile may be output to a display module 20, or the like, for viewing or processing.

INDUSTRIAL APPLICABILITY

In satisfaction of the above-identified needs, an improved energy profile device and method are disclosed for profiling power consumption information of executed code. The energy profiling apparatus exchanges information with a measurement module, a data processing module and a display module, and further, generates an energy profile of executed code based on correlations between measured data and application trace data. By allowing direct integration into an evaluation board, the disclosed energy profiler reduces costs and the need for added parts. The energy profiler further provides a more simplified, for example, one-pin or serial interface, with a processor so as to further reduce costs and minimize power consumption. The energy profiler additionally provides added flexibility by allowing trace data transfer rates that are independent of and significantly faster than processor operating frequencies. The energy profiler is also capable of reading and processing real-time power consumption data for more detailed feedback to a user.

While only certain embodiments have been set forth, alternatives and modifications will be apparent from the above description to those skilled in the art. These and other alternatives are considered equivalents and within the spirit and scope of this disclosure and the appended claims.

What is claimed:

1. An energy profiling apparatus for profiling power consumption characteristics of self-executable application code under development being executed at an integrated circuit being powered by a power source and having a measurement module, a data processing module and an external resource, comprising:
   a first interface configured to receive a first data set from the measurement module corresponding to power consumption of the executed code;
   a second interface configured to receive a second data set from the data processing module corresponding to trace data of the executed code;
   a third interface configured to transmit a third data set to the external resource; and
   a profile module configured to correlate the first data set with the second data set such that changes in the power consumption of the executed application code correspond to changes in the trace data of the executed application code, and generate an energy profile of the application code executed at the data processing module based on the correlation between the first data set and the second data set, the profile module further configured to transmit the energy profile as part of the third data set to the external resource.

2. The apparatus of claim 1, wherein the profile module is configurable to be operated independently of the data processing module.

3. The apparatus of claim 1, wherein the first interface is configured to allow communications with the measurement module in real-time.

4. The apparatus of claim 1, wherein the first data set pertains at least in part to instantaneous current consumption.

5. The apparatus of claim 1, wherein the second interface is configured to be a one-pin interface.

6. The apparatus of claim 1, wherein the second interface is configured communicate at an interface frequency that is independent of a clock frequency of the data processing module.

7. The apparatus of claim 1, wherein the second data set includes application trace data.

8. The apparatus of claim 1, wherein the correlation includes a statistical interpretation of measurements of the first data set and sub-sampled trace data of the second data set.

9. The apparatus of claim 1, wherein the third data set is transmitted to an external personal computer for post processing.

10. A method for profiling energy consumption characteristics of self-executable application code under development being executed at a data processing module, comprising the steps of:
    receiving a first data set pertaining to power consumption information of the code being executed at the data processing module;
    receiving a second data set pertaining to application trace information of the code being executed at the data processing module;
    correlating the first data set with the second data set such that changes in the power consumption information of the executed application code being executed at the data processing module correspond to changes in the application trace information of the executed application code being executed at the data processing module; and
    generating an energy profile of the executed code based on the correlation between the first data set and the second data set.

11. The method of claim 10, wherein the step of receiving the first data set occurs in real-time.

12. The method of claim 10, wherein the second data set pertains at least in part to instantaneous current consumption.

13. The method of claim 10, wherein the step of receiving the second data set occurs at an interface frequency that is independent of clock frequency of the data processing module.

14. The method of claim 10, wherein the step of receiving the second data set is received through a one-pin interface.

15. The method of claim 10, wherein the step of receiving the second data set is received at an interface frequency that is independent of a clock frequency of the data processing module.

16. The method of claim 10 further comprising a step of outputting the energy profile to a display module.

17. The method of claim 10, wherein the energy profile includes a statistical interpretation of measurements of the first data set and sub-sampled trace data of the second data set.

18. The method of claim 10, wherein the energy profile includes graphical information for appropriately displaying the energy profile at the display module.

19. The method of claim 10, wherein data associated with the energy profile is output to an external resource.

* * * * *